May 17, 1966 U. E. SBARAGLIA ETAL 3,251,184
VARIABLE-THRUST ROCKET ENGINE
Filed June 18, 1963 4 Sheets-Sheet 1
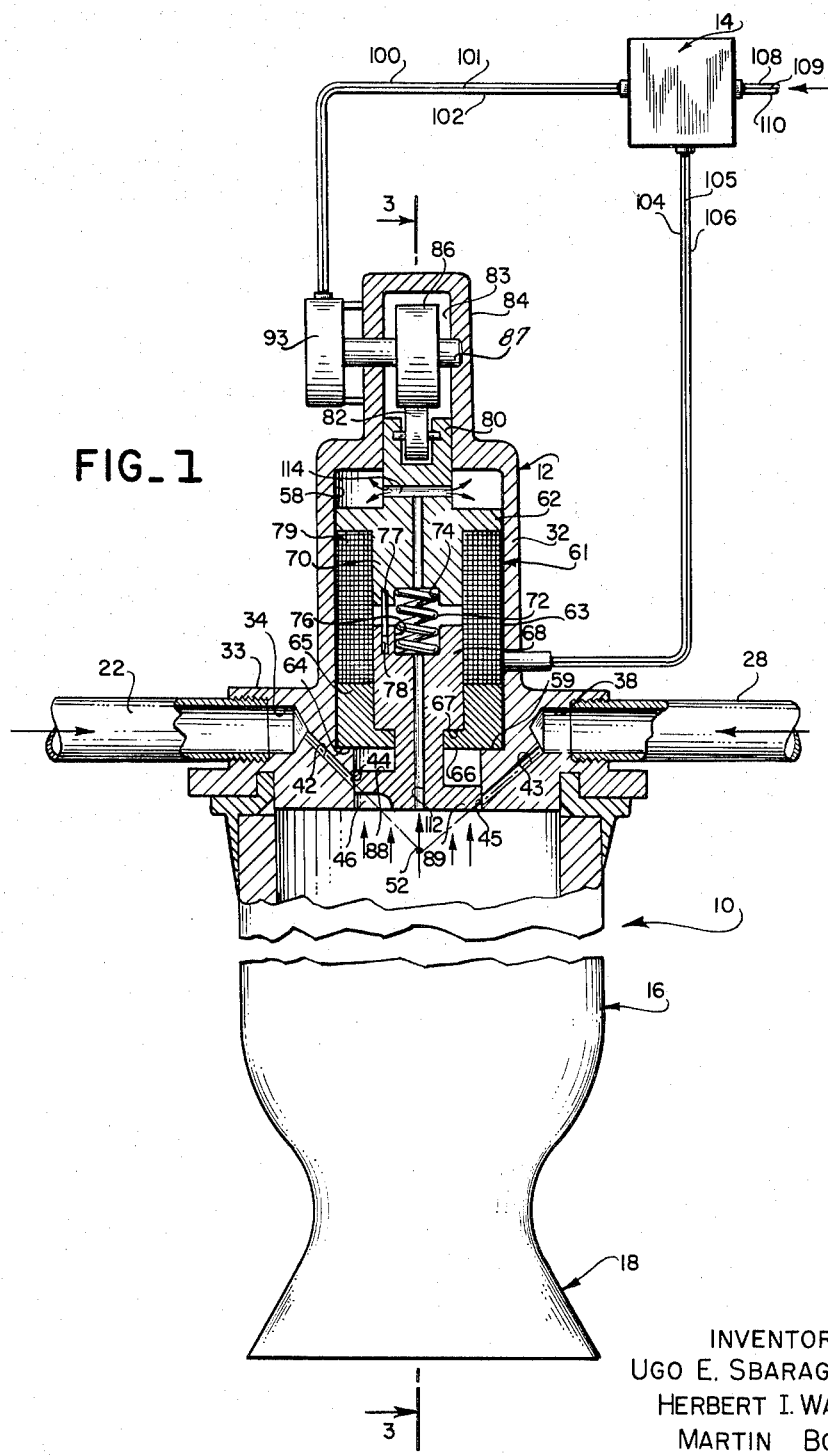
FIG_1
INVENTORS
UGO E. SBARAGLIA
HERBERT I. WAXMAN
MARTIN BOXER
By R. E. Giauque
Attorney May 17, 1966  U. E. SBARAGLIA ETAL  3,251,184
VARIABLE-THRUST ROCKET ENGINE
Filed June 18, 1963                    4 Sheets-Sheet 2
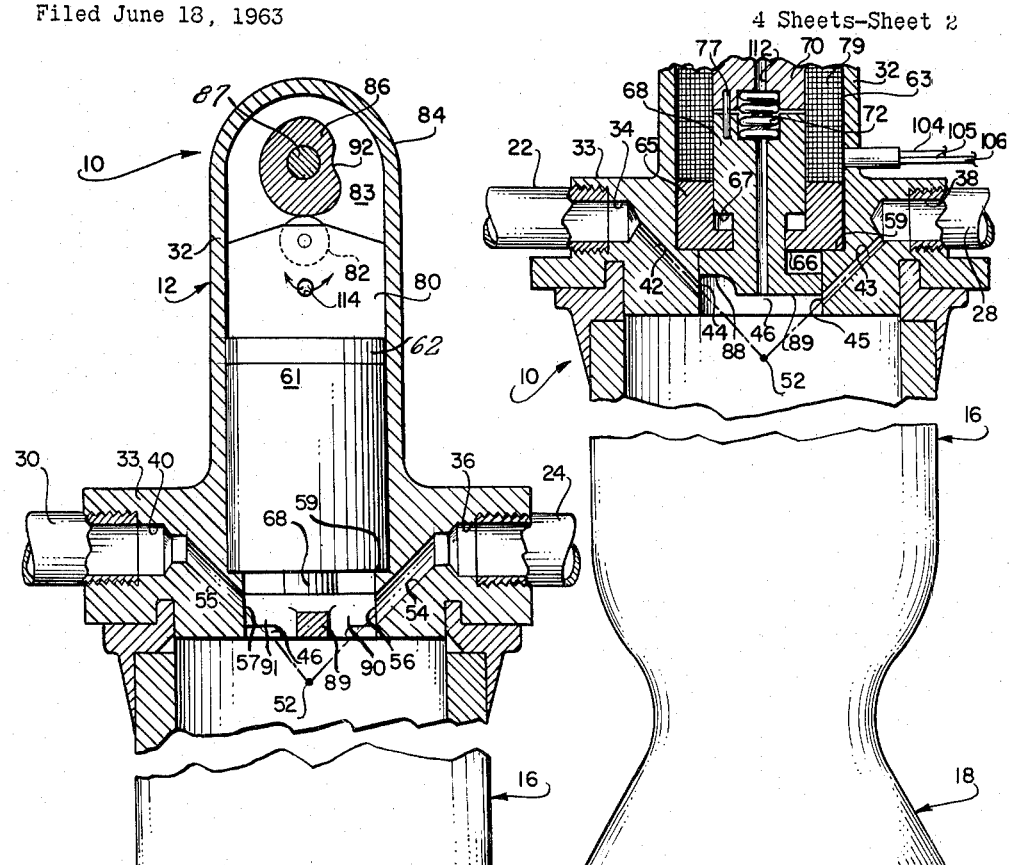
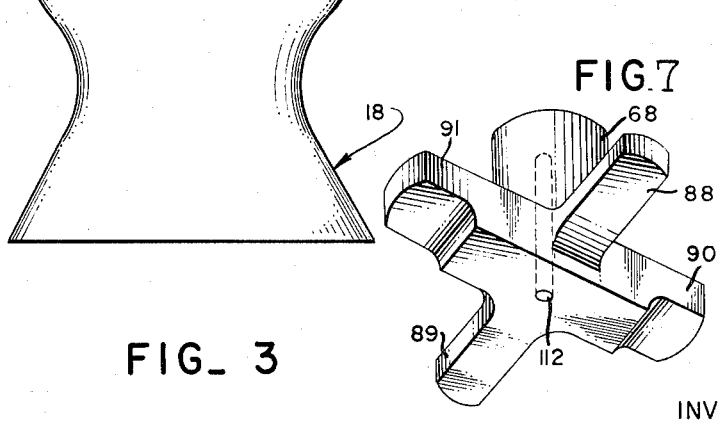
INVENTORS
UGO E. SBARAGLIA
HERBERT I. WAXMAN
MARTIN BOXER
By R. E. Geaugue
Attorney

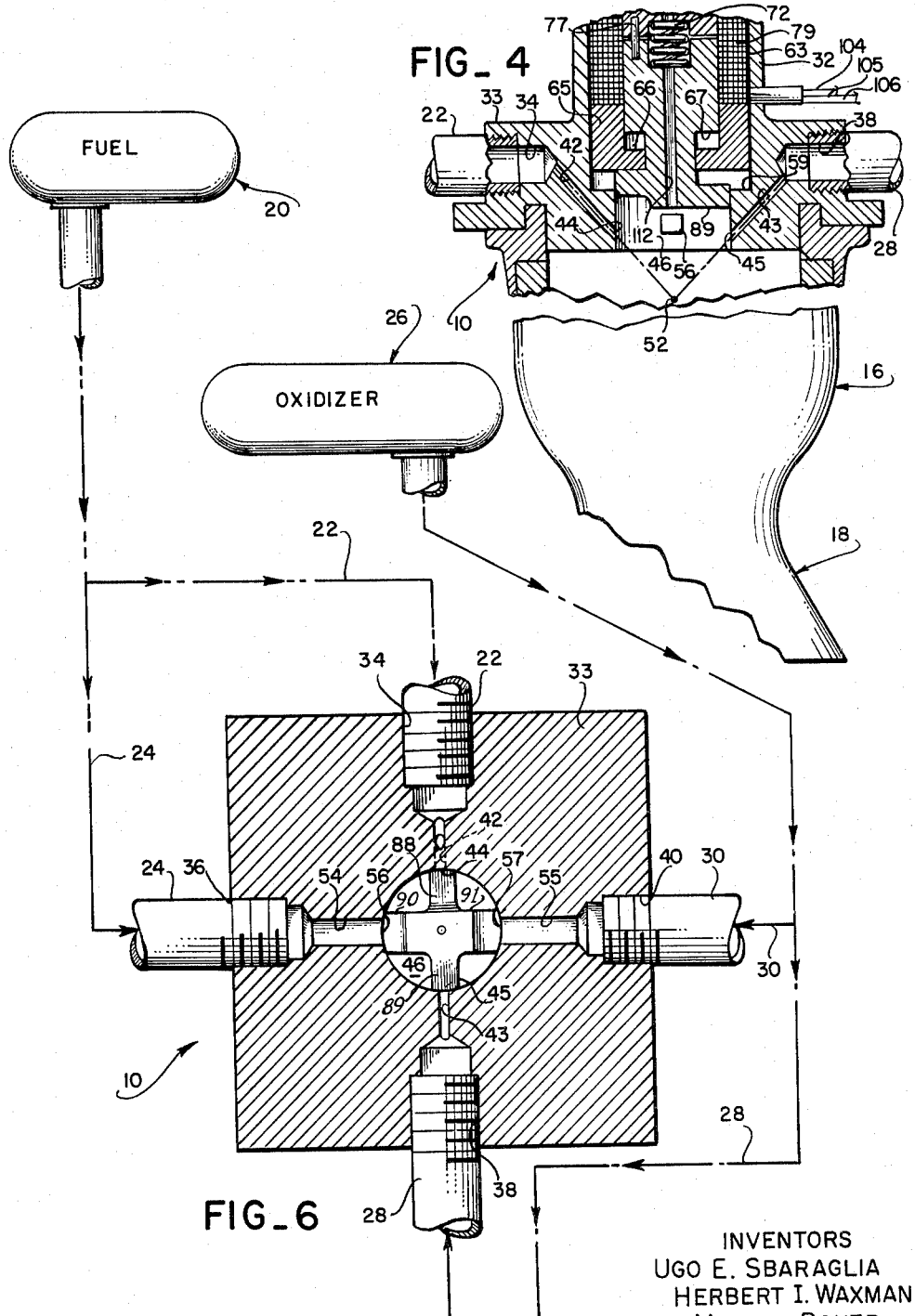

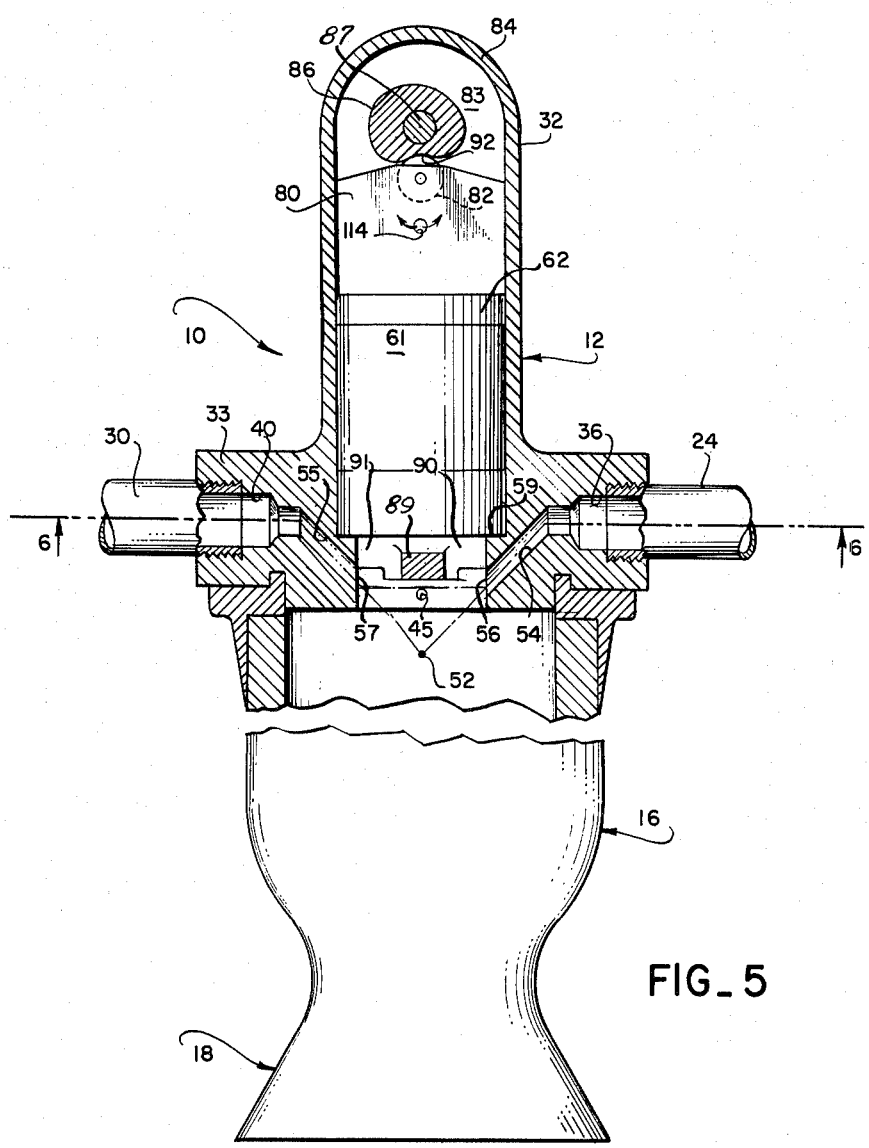
FIG_5

United States Patent Office 3,251,184
Patented May 17, 1966

3,251,184
VARIABLE-THRUST ROCKET ENGINE
Ugo E. Sbaraglia, Reseda, Herbert I. Waxman, Northridge, and Martin Boxer, Redlands, Calif., assignors to The Marquardt Corporation, Van Nuys, Calif., a corporation of California
Filed June 18, 1963, Ser. No. 288,645
10 Claims. (Cl. 60—35.6)

This invention relates to a variable-thrust rocket engine and more particularly to such an engine having wide throttling range fuel injection.

Prior methods of modulating thrust output of single chamber rocket engines either changed the flow rate of propellants in continuous output motors or changed the pulse width or pules frequency of intermittent thrust engines. By either of these individual means, conventional modulation techniques are usually not capable of providing a range of thrust modulation greater than 30:1. Previous attempts to extend this range with either the change-of-flow-rate method or the pulsing method have been primarily unsuccessful because design parameters of atomizers, orifices and nozzles limit the range attainable with either method when used alone.

In view of the foregoing factors and conditions characteristic of variable thrust rocket engines, it is a primary objective of the present invention to provide a new and improved variable thrust rocket engine not subject to the disadvantages enumerated above and having a throttling device especially designed for changing propellant flow rates to vary thrust ratios efficiently, economically and expeditiously.

Another object of the invention is to provide a variable-thrust rocket engine having a single propellant ejector unit capable of extending the range of thrust modulation beyond that obtainable with prior art devices.

Still another object of the present invention is to provide a variable-thrust rocket engine having a propellant injector which extends the range of thrust modulation without sacrificing engine efficiency.

A further object of the present invention is to provide a variable thrust rocket engine having propellant injectors arranged about the opening into a combustion chamber in such a manner that propellant flowing from the injector has a common impingement point within the combustion chamber.

Yet another object of the present invention is to provide a combustion chamber for power developing units into which fuel and oxidizer may be injected either intermittently or continuously in response to thrust demand.

Another object of the present invention is to provide a throttling valve for the injector system of a variable-thrust rocket engine which is pressure balanced to reduce actuation loads.

Another object of the present invention is to combine a low-inertia pulsing valve and a low-inertia, cam driven throttling valve in a single propellant injector for a variable-thrust rocket engine.

Basically, the present invention combines a pulse-type fuel injector with a continuous-flow-type injector into a single integrated unit. The pulse mode of operation covers the low thrust range and a continuous-flow mode of operation covers the high thrust range. Since the total range of thrust modulation is the product of each mode, if each mode has a range of 30:1, as in the prior art, the total range of the device of the present invention will be 900:1. A combustion chamber and nozzle are provided and pressurized, liquid fuel and oxidizer are injected into the chamber to react hypergolically. A set of fuel and oxidizer orifices are provided which may be opened and closed rapidly by a valve. The valve is spring biased to close the orifices and a solenoid is energized to uncover the orifices. The valve is pulsed by rapidly energizing and de-energizing the solenoid. The valve may be retained open by the solenoid for maximum thrust wherein continuous combustion occurs from a steady flow of propellants from the two orifices. The valve also covers a pair of rectangular ports which supply propellant to the combustion chamber and a motor driven cam is employed to progressively uncover these ports should the continuous thrust due to steady flow of propellants from the two orifices, when the valve is retained in its open position by the solenoid, be insufficient. That is, the valve can be pulsed by the solenoid to cyclically open and close the orifices or the solenoid can retain the valve in an open position to completely uncover the orifices and then the valve may be moved by the cam to progressively uncover the ports while the orifices remain uncovered. While various hypergolic fuels and oxidizers can be utilized, hydrazine fuel and nitrogen tetroxide oxidizer are entirely suitable.

The features of the present invention which are believed to be novel are set forth with particularity in the appended claims. The present invention, both as to its organization and manner of operation, together with further objects and advantages thereof, may best be understood by reference to the following description, taken in conjunction with the accompanying drawings, in which:

FIGURE 1 is a vertical, cross-sectional view, with parts shown in elevation, of a variable-thrust rocket engine of the present invention;

FIGURE 2 is a fragmentary cross-sectional view of the device of FIGURE 1 with the parts shown in the first operating position;

FIGURE 3 is a vertical, cross-sectional view, with parts shown in elevation, taken along line 3—3 of FIGURE 1;

FIGURE 4 is a fragmentary cross-sectional view of the device of FIGURE 1 in a second operating position;

FIGURE 5 is a vertical, cross-sectional view similar to FIGURE 3, but with the parts shown in a different operating position;

FIGURE 6 is a transverse cross-sectional view taken along line 6—6 of FIGURE 5; and FIGURE 7 is a perspective view of the lower core member and valve members carried thereby.

Referring again to the drawings and particularly to FIGURES 1 and 6, the variable-thrust rocket engine constituting the present invention, generally designated 10, includes an injector assembly 12, a programmer 14, a combustion chamber 16 and a nozzle 18. The injector 12 receives a suitable fuel, such as hydrazine ($N_2H_4$), from a pressurized fuel storage tank 20 through fuel inlet conduits 22 and 24 and receives a suitable oxidizer, such as nitrogen tetroxide ($N_2O_4$), from a pressurized oxidizer storage tank 26 through oxidizer inlet conduits 28 and 30. Fuel and oxidizer, hereinafter referred to as a propellant, may be injected into the combustion chamber 16 through means and in a manner to be hereinafter described, where they mix together and react hypergolically to produce a fast build-up of pressure and exert a thrust on engine 10 when discharged through nozzle 18.

The injector 12 comprises a body portion 32 having a rectangular base 33 in which fuel inlet ports 34 and 36 and oxidizer inlet ports 38 and 40 are mounted in communication with the fuel and oxidizer inlet conduits 22 and 24, and 28 and 30, respectively. First and second passageways 42 and 43 place the fuel inlet port 34 and the oxidizer inlet port 38, respectively, into communication with orifices 44 and 45, respectively, which discharge into a first cylindrical chamber 46 forming an open end in base 33 in communication with the combustion chamber 16. The orifices 44 and 45 are circular in shape, as shown for the orifice 45 in FIGURE 5, and the passageways 42 and 43 are arranged in the base 33 in such a manner that the propellant discharging through orifices 44 and 45 has a comon point of impingement 52 within combustion chamber 16.

Referring now to FIGURES 3 and 6, third and fourth passageways 54 and 55 place the fuel and oxidizer inlet ports 36 and 40, respectively, into communication with fuel and oxidizer outlet ports 56 and 57, respectively. The ports 56 and 57 are rectangularly shaped, as shown for the port 56 in FIGURE 4, and passageways 54 and 55 are placed in base 33 in such a manner that they too discharge into combustion chamber 16 at impingement point 52.

Referring now to FIGURES 1, 3 and 5, a second cylindrical chamber 58, of larger diameter than the chamber 46, is mounted in body portion 32 and extends into base 33 in communication with the chamber 46 thereby forming an annular land 59.

A cylindrical piston 61 is slidably mounted in chamber 58 and includes an upper wall 62 from which an encompassing sidewall 63 depends. The side wall 63 has an open bottom 64 in which a retainer 65 is mounted. The retainer 65 is adapted to bottom-out on land 59 and includes an inturned annular flange 66 which is engageable by an annular shoulder 67 formed on a lower core member 68 of piston 61 to limit the downward travel of the core member 68. The piston 61 also includes an upper core member 70 which depends from wall 62. The members 68 and 70 are biased apart by means of a compression spring 72 having one end seated in a recess 74 formed in the lower end of core member 70 and the other end seated in a recess 76 formed in the upper end of core member 68. Relative rotation between the core members 68 and 70 is prevented by means of a pin 77 which is rigidly affixed to the lower end of core member 70 and which slidably engages a cylindrical bore 78 in the upper end of core member 68. An electrical coil 79 encompasses the core members 68 and 70 with its upper end abutting the wall 62 and its lower end abutting retainer 65. The upper core meber 70 includes a bifurcated portion 80 which carries a cam follower 82 and extends above wall 62 into slidable engagement with a channel 83 formed in a cap 84 constituting the upper end of body portion 32. A cam 86 is rigidly affixed to a shaft 87 which is rotatably mounted in cap 84 and engages the cam follower 82.

The lower end of core member 68 includes pulsating valve members 88 and 89 and modulating valve members 90 and 91 which control flow through orifices 44 and 45 and ports 56 and 57, respectively. As illustrated in FIGURE 7, the valve member 88–91 are integral with the lower core member 68.

When the retainer 65 is bottomed on land 59 and the core member 68 is moved upwardly until valve member 88 engages retainer 65, as shown in FIGURE 2, the orifices 44 and 45 will be fully uncovered and the ports 56 and 57 will remain covered. Then, if cam 86 is rotated to its low spot 92 so that the piston 61 is free to move upwardly until the retainer 65 assumes the position shown in FIGURE 4 with valve member 88 still in abutment with retainer 65, the ports 56 and 57 will also be fully uncovered. The cam 86 is shaped in such a manner that it will permit modulating valve members 90 and 91 to progressively uncover ports 56 and 57 upon rotation of the cam 86 while core member 68 is in its up position. A torque motor 93 is connected to shaft 87 and drives cam 86 upon receipt of a suitable signal from programmer 14 through electrical leads 100, 101 and 102. Electrical leads 104, 105 and 106 connect coil 79 to the programmer 14 which receives input signals through leads 108, 109 and 110.

The programmer 14 responds through suitable means, such as a magnetic tape, not shown, to cyclically energize and de-energize coil 79 when a first command signal is received through leads 108, 109 and 110. This reciprocates or rapidly pulses core member 68 to cover and uncover orifices 44 and 45. Each time the orifices 44 and 45 are uncovered, propellant combusts in combustion chamber 16. When a second command signal is received through leads 108, 109 and 110, coil 79 remains energized to hold core member 68 in its up position so that flow of propellant through ports 44 and 45 will be continuous. When a third command signal is received, coil 79 will not only remain energized, but torque motor 93 will also be energized to rotate cam 86 to progressively uncover ports 56 and 57. Combustion in chamber 16 creates a back pressure on the lower end of core member 68 tending to drive it upwardly against the pressure of spring 72. This force is employed both to minimize the electrical force required to activate coil 79 to draw core 68 upwardly against the force exerted by spring 72, and to move the piston 61 upwardly so that cam follower 82 will follow cam 86. A circular passageway 112 is drilled in core members 68 and 70 in communication with a transverse bore 114 in bifurcated member 80 so that the combustion chamber pressure will pass through passageway 112 and bore 114 into chamber 58 onto wall 62 to relieve actuation loads on core members 68 and 70 and provide a faster response.

Operation of the device will be readily understood. Assuming that the pulsing valve members 88 and 89 and the modulating valve members 90 and 91 are in the position shown in FIGURES 1 and 3, which is the condition of shut off, a low thrust output may be initiated by having a signal from programmer 14 energize coil 79 to cause the lower core member 68 to move up until valve member 88 engages the retainer 65. This uncovers the orifices 44 and 45, as shown in FIGURE 2, permitting fuel and oxidizer to contact each other at impingement point 52 in combustion chamber 16 and create a thrust by combusting and exhausting out nozzle 18. The coil 79 may then be de-energized to release core member 68 so that spring 72 will push core member 68 downwardly until annular shoulder 67 engages flange 66 on retainer 65 at which point the pulsing valve members 88 and 89 will again cover orifices 44 and 45 to terminate the flow of fuel and oxidizer. This completes one pulse cycle. The programmer 14 can be programmed for a low-thrust mode of operation in such a manner that the coil 79 will be energized and de-energized in accordance with a predetermined pulsing frequency or to produce a predetermined pulse width or both in varying degrees as may be required. Maximum thrust from this low-thrust mode of operation occurs when the core member 68 is retained in its up position by the coil 79 and continuous (non-pulsing) combustion occurs from steady flow of propellant from the orifices 44 and 45. During the low-thrust mode of operation, the retainer 65, the coil 79 and the upper member 70 are held together in a down position, wherein retainer 65 abuts annular land 59, by the setting of the cam 86 and follower 82. This position is shown in FIGURES 1, 2 and 3 and is maintained even though the lower core member 68 moves upwardly, as shown in FIGURE 2. As long as the low-thrust mode of operation is sufficient to meet thrust requirements, the cam 86 remains in the position of FIGURE 3. When the input signal to programmer 14 calls for more net effective output thrust than can be provided by the low-thrust mode, the progammer 14 activates the torque motor 93 to cause the cam 86 to be rotated from the position shown in FIGURE 3. When this occurs, the cam follower 82, the sidewall 63, the upper core member 70 and the retainer 65 all move upward progressively as the cam 86 rotates until cam follower 82 engages low spot 93 at which time the piston 61 will be in the position shown in FIGURES 4 and 5. This upward movement of the piston 61 moves the modulating valve members 90 and 91 to uncover the ports 56 and 57 and initiate high-thrust, non-pulsing mode of operation. If, after starting this mode and increasing the thrust level, the required thrust is met, the programmer 14 stops the cam 86 at its then position to hold the modulating valve members 90 and 91 at their partly open setting. If less thrust is then demanded, the torque motor 93 reverses the direction of turning the cam 86 to push the modulating valve members 90 and 91 down and cover more of the ports 56 and 57 to reduce propellant flow rate and thrust.

While the particular variable-thrust rocket engine herein shown and described in detail is fully capable of attaining the objects and providing the advantages hereinbefore stated, it is to be understood that it is merely illustrative of the presently preferred embodiment of the invention and that no limitations are intended to the details of construction or design herein shown other than as defined in the appended claims.

What is claimed is:

1. A variable-thrust rocket engine comprising:
   a combustion chamber for producing a propulsion medium;
   a thrust producing nozzle connected with said combustion chamber and discharging said medium;
   first movable valve means permitting intermittent injection of a substance into said combustion chamber to produce said medium;
   second movable valve means permitting continuous injection of said substance into said combustion chamber;
   first means for moving said first valve means in a pulsing mode to produce intermittent injection of said substance into said combustion chamber; and
   second means for moving said second valve means to produce continuous injection of said substance into said combustion chamber.

2. A variable-thrust rocket engine comprising:
   a combustion chamber for producing a propulsion medium;
   a thrust producing nozzle connected with said combustion chamber and discharging said medium;
   first movable valve means having a first operating mode permitting intermittent injection of a substance into said combustion chamber to produce said medium and a second operating mode permitting continuous injection of said substance into said combustion chamber to produce said medium;
   second movable valve means operable only when said first valve means is operating in said second mode and permitting continuous injection of said substance into said combustion chamber;
   first means for moving said first valve means in said first and second operating modes; and
   second means for moving said second valve means to produce continuous injection of said substance into said combustion chamber.

3. The engine of claim 2 wherein said first means for moving said first valve comprises a solenoid.

4. The engine of claim 3 wherein said second means for moving said second valve means comprises a motor driven cam.

5. A variable-thrust rocket engine comprising:
   a combustion chamber for producing a propulsion medium;
   a thrust producing nozzle connected with said combustion chamber and discharging said medium;
   first movable valve means permitting intermittent injection of a first substance into said combustion chamber;
   second movable valve means permitting intermittent injection of a second substance into said combustion chamber for combination with said first substance to produce said medium;
   third movable valve means permitting continuously injection of said first substance into said combustion chamber;
   fourth movable valve means permitting continuous injection of said second substance into said combustion chamber;
   first means for moving said first and second valve means in a pulsing mode to produce intermittent injection of said first and second substances to produce intermittent thrust pulses from combination of said substances; and
   second means for moving said third and fourth valve means to continuously inject said substances into said combustion chamber to produce a continuous thrust pulse from combination of said substances.

6. A variable-thrust rocket engine comprising:
   a combustion chamber for producing a propulsion medium;
   a thrust producing nozzle connected with said combustion chamber and discharging said medium;
   first and second passage means placing said combustion chamber in communication with a first substance;
   third and fourth passage means placing said combustion chamber in communication with a second substance;
   first movable valve means for intermittently opening said first and third passage means during one operating mode and to continuously open said first and third passages during another operating mode to inject said first and second substances into said combustion chamber for combination with each other to produce said medium;
   second movable valve means for opening said second and fourth passage means to inject said first and second substances into said combustion chamber for combination with each other to produce said medium;
   first means for selectively moving said first valve means in a pulsing mode to produce intermittent injection of said substances and in a continuously open mode for continuous injection of said substances; and
   second means for moving said second valve means to progressively open said second and fourth passage means.

7. The engine of claim 6 wherein said second means progressively opens said second and fourth passage means only after said first means has moved into first valve means to its continuously open mode.

8. The engine of claim 6 wherein said first means comprises a solenoid.

9. The engine of claim 6 wherein said second means comprises a cam.

10. A propellant injector for a variable-thrust rocket engine having a combustion chamber exhausting through a nozzle in communication therewith comprising:
    a body portion having first and second fuel inlet ports and first and second oxidizer inlet ports communicating with said chamber;
    an electrical coil movably mounted in said body portion;
    cam means operable to progressively move said coil from a first position to a second position in said body portion; and
    a core member reciprocably mounted in said body member for flux linkage with said coil upon energization thereof, said core member including first valve means for normally closing said first fuel and oxidizer inlet ports and second valve means for normally closing said second fuel and oxidizer inlet ports, said core member being linked to said cam means in such a manner that said second valve means is maintained in its normal position when said coil is in its first position regardless of the position of said core member due to energization of said coil, said first valve means being moved from its normal position to open said first fuel and oxidizer inlet ports when said coil is energized.

(References on following page)

References Cited by the Examiner

UNITED STATES PATENTS

| | | | |
|---|---|---|---|
| 3,004,720 | 10/1961 | Knapp et al. | 239—585 |
| 3,048,969 | 8/1962 | Horner | 60—35.6 |
| 3,088,406 | 5/1963 | Horner | 60—35.6 X |
| 3,100,963 | 8/1963 | Michel | 60—35.6 |
| 3,131,866 | 5/1964 | Cummins et al. | 239—533 X |

MARK NEWMAN, *Primary Examiner.*

SAMUEL LEVINE, *Examiner.*

D. HART, *Assistant Examiner.*